United States Patent
Dadheech et al.

(10) Patent No.: US 9,647,254 B2
(45) Date of Patent: May 9, 2017

(54) COATED SEPARATOR AND ONE-STEP METHOD FOR PREPARING THE SAME

(71) Applicant: GM GLOBAL TECHNOLOGY OPERATIONS LLC, Detroit, MI (US)

(72) Inventors: Gayatri Vyas Dadheech, Bloomfield Hills, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 137 days.

(21) Appl. No.: 14/560,322

(22) Filed: Dec. 4, 2014

(65) Prior Publication Data

US 2015/0162583 A1  Jun. 11, 2015

Related U.S. Application Data

(60) Provisional application No. 61/912,457, filed on Dec. 5, 2013.

(51) Int. Cl.
| | |
|---|---|
| H01M 2/14 | (2006.01) |
| H01M 2/16 | (2006.01) |
| C23C 4/10 | (2016.01) |
| C23C 4/134 | (2016.01) |
| B82Y 30/00 | (2011.01) |

(52) U.S. Cl.
CPC ............... *H01M 2/145* (2013.01); *C23C 4/10* (2013.01); *C23C 4/134* (2016.01); *H01M 2/1646* (2013.01); *H01M 2/1653* (2013.01); *H01M 2/1686* (2013.01); *B82Y 30/00* (2013.01)

(58) Field of Classification Search
CPC .. H01M 2/145; H01M 2/1646; H01M 2/1653; H01M 2/1686
See application file for complete search history.

(56) References Cited

U.S. PATENT DOCUMENTS

| | | | | |
|---|---|---|---|---|
| 4,011,365 A | * | 3/1977 | Lindstrom | H01M 10/34 429/219 |
| 6,025,034 A | * | 2/2000 | Strutt | B01J 13/02 427/212 |
| 2004/0229031 A1 | * | 11/2004 | Gell | B82Y 30/00 428/323 |
| 2006/0222777 A1 | * | 10/2006 | Skoog | B05B 7/201 427/446 |
| 2011/0217585 A1 | | 9/2011 | Wang et al. | |
| 2013/0071734 A1 | * | 3/2013 | Wertz | H01M 10/08 429/204 |
| 2015/0140284 A1 | * | 5/2015 | Mantkowski | F01D 25/005 428/195.1 |

* cited by examiner

*Primary Examiner* — Carlos Barcena
(74) *Attorney, Agent, or Firm* — Harness, Dickey & Pierce, P.L.C.

(57) ABSTRACT

In a one-step method for preparing a coated separator, a suspension of i) a ceramic, ii) a cermet, iii) a ceramic with an electrolyte, or iv) a cermet with an electrolyte in a carrier liquid is plasma sprayed without a carrier gas. The carrier liquid is water, alcohol, ethylene glycol, or mixtures thereof.

14 Claims, 4 Drawing Sheets

US 9,647,254 B2

COATED SEPARATOR AND ONE-STEP METHOD FOR PREPARING THE SAME

CROSS-REFERENCE TO RELATED APPLICATIONS

This application claims the benefit of U.S. Provisional Patent Application Ser. No. 61/912,457, filed Dec. 5, 2013, which is incorporated by reference herein in its entirety.

BACKGROUND

Secondary, or rechargeable, lithium-sulfur batteries or lithium ion batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of a one-step method for preparing a coated separator, a suspension of i) a ceramic, ii) a cermet, iii) a ceramic with an electrolyte, or iv) a cermet with an electrolyte in a carrier liquid is plasma sprayed without a carrier gas. The carrier liquid is water, alcohol, ethylene glycol, or mixtures thereof. Various coated separators are also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
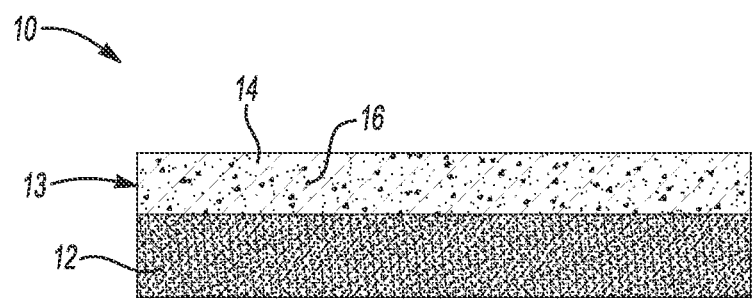
FIG. 1 is a cross-sectional view of an example of a coated separator including a ceramic-electrolyte coating.

Lithium-sulfur batteries and other lithium ion batteries generally operate by reversibly passing lithium ions between a negative electrode (sometimes called an anode) and a positive electrode (sometimes called a cathode). The negative and positive electrodes are situated on opposite sides of a porous separator soaked with an electrolyte solution that is suitable for conducting the lithium ions. Each of the electrodes is also associated with respective current collectors, which are connected by an interruptible external circuit that allows an electric current to pass between the negative and positive electrodes.

It has been found that the lithium-sulfur battery life cycle may be limited by the migration, diffusion, or shuttling of lithium-polysulfide intermediates ($LiS_x$, where x is $2<x<8$ from the sulfur cathode during the battery discharge process, through the porous separator, to the anode. The lithium-polysulfide intermediates generated at the cathode are soluble in the electrolyte, and can migrate to the anode (e.g., a lithium electrode) where they react with the anode in a parasitic fashion to generate lower-order lithium-polysulfide intermediates. These lower-order lithium-polysulfide intermediates diffuse back to the cathode and regenerate the higher forms of lithium-polysulfide intermediates. As a result, a shuttle effect takes place. This effect leads to decreased sulfur utilization, self-discharge, poor cycleability, and reduced coulombic efficiency of the battery. Without being bound to any theory, it is believed that even a small amount of lithium-polysulfide intermediates forms an insoluble final product, such as dilithium sulfide ($Li_2S$), that can permanently bond to the anode. This may lead to parasitic loss of active lithium at the anode can lead to parasitic loss of active lithium at the anode, which prevents reversible electrode operation and reduces the useful life of the lithium-sulfur battery.

As noted above, the shuttle effect leads to decreased sulfur utilization. This is due to the fact that when the lithium-polysulfide intermediates are formed, the sulfur in the cathode is depleted. A reduced amount of sulfur in the cathode means that there is less sulfur available for use. The depletion of sulfur also contributes to the limited life cycle of sulfur-based batteries. It is to be understood that the lithium-polysulfide intermediates are referred to herein as polysulfides.

Similarly, it has been found that lithium ion batteries are deleteriously affected by the dissolution of transition metal cations from the cathode, which results in accelerated capacity fading, and thus loss of durability in the battery. The transition metal cations migrate from the cathode to the anode of the battery, leading to its "poisoning". For instance, a graphite anode may be poisoned by $Mn^{+2}$, $Mn^{+3}$, or $Mn^{+4}$ cations that dissolve from spinel $Li_xMn_2O_4$ of the cathode. For instance, the $Mn^{+2}$ cations may migrate through the battery electrolyte and porous polymer separator, and deposit onto the graphite electrode. When deposited onto the graphite, the $Mn^{+2}$ cations become Mn metal. It has been shown that a relatively small amount (e.g., 90 ppm) of Mn metal can poison the graphite electrode and prevent reversible electrode operation, thereby deleteriously affecting the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge—discharge cycling).

The diffusion of polysulfide in the lithium-sulfur battery or of transition metal cations in the lithium ion battery may be reduced or prevented by incorporating an example of the porous separator disclosed herein. Examples of the coated separator include a ceramic coating, a cermet coating (i.e., ceramic and metallic coating), a ceramic-electrolyte coating, or a cermet-electrolyte coating. The coating may be a single layer, a bilayer, or a multi-layered structure with three or more layers. Each example of the coating is lithium conducting, either by incorporation of an electrolyte material as part of the coating composition or by introducing an electrolyte into pores of the coating. The coating also includes pores sized to block/trap polysulfide ions or transition metal cations from passing through. As such, the coated separators disclosed herein act as a barrier that may improve the capacity and useful life of the battery.

Figure 2:
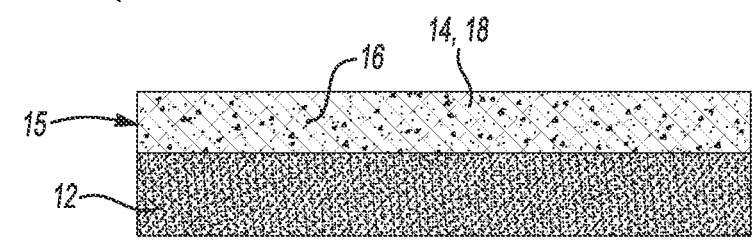
FIG. 2 is a cross-sectional view of an example of a coated separator including a cermet-electrolyte coating.

In an example, the coating on the separator may be a ceramic coating or a ceramic-electrolyte coating. An example of the separator 10 including the porous membrane 12 and the ceramic-electrolyte coating 13 is depicted in FIG. 1. In another example, the coating on the separator may be a cermet coating or a cermet-electrolyte coating. An example of the separator 10' including the porous membrane 12 and the cermet-electrolyte coating 15 is depicted in FIG. 2.

It is to be understood that the porous membrane 12 and the coating (whether the ceramic coating, the ceramic-electrolyte coating 13, the cermet coating, or the cermet-electrolyte coating 15) are both porous, and that the components of the coating may be deposited on the surface(s) of the membrane 12 and may also penetrate the pores of the membrane 12.

Examples of the porous membrane 12 include a porous glass membrane, a porous polyethylene and/or polypropylene membrane, or an array of nanotubes (e.g., titanium nanotubes). Still other examples of the porous membrane 12 include polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Mis.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous membrane 12 is poly(p-hydroxybenzoic acid). In yet another example, the porous membrane 12 may be chosen from a combination of the polyolefin (such as PE and/or PP) and one or more of the listed polymers.

The porous membrane 12 may be a single layer, a bilayer, or a multi-layer (e.g., having three or more layers) laminate fabricated from either a dry or wet process. For example, a single layer of the polyolefin and/or other listed polymer may constitute the entirety of the porous membrane 12. As another example, however, multiple discrete layers of similar or dissimilar polyolefins and/or polymers may be assembled into the porous membrane 12. In one example, a discrete layer of one or more of the polymers may be coated on a discrete layer of the polyolefin to form the porous membrane 12. In some instances, the porous membrane 12 may include fibrous layer(s) to impart appropriate structural and porosity characteristics.

The ceramic coating includes a ceramic material 14, and the ceramic-electrolyte coating 13 (shown in FIG. 1) includes the ceramic material 14 as well as an electrolyte material 16. The cermet coating includes a ceramic material 14 and a metallic material 18, and the cermet-electrolyte coating 15 (shown in FIG. 2) includes the ceramic material 14, the metallic material 18, and the electrolyte material 16.

Suitable ceramic materials 14 include oxides, non-oxides, or combinations of oxides and non-oxides. Example oxide materials include aluminum oxide (i.e., $Al_2O_3$ or alumina), silicon oxide (i.e., $SiO_2$ or silica), chromium oxide (i.e., $Cr_2O_3$ or chrome), titanium dioxide (i.e., $TiO_2$ or titania), cerium(IV) oxide (i.e., $CeO_2$ or ceria), beryllium oxide (i.e., BeO or beryllia), aluminum oxide-titanium oxide-silicon oxide (i.e., $Al_2O_3$-$SiO_2$-$TiO_2$ or alumina titania), zirconium oxide ($ZrO_2$ or zirconia), or yttrium oxide-zirconium oxide ($ZrO_2$-$Y_2O_3$ or TBC-Thermal Barrier Coating). Example non-oxide materials include carbide, boride, nitride, and silicide. The ceramic material 14 may also be reinforced with particulates, fibers, or the like. As will be discussed further below, any of these materials may be used in the suspension that is used to form the ceramic coating, the ceramic-electrolyte coating 13, the cermet coating, or the cermet-electrolyte coating 15. These materials may be in the form of nano- or micro-sized particles (i.e., having a diameter or average diameter ranging from about 1 nm to about 200 μm). In some examples, the particle size of the suspension 22 components ranges from about 1 nm to about 10,000 nm. In another example, the nanoparticle size may range from about 40 nm to about 70 nm. Precursors of any of the listed ceramic materials 14 may also be used in the suspension.

Suitable metallic materials 18 include transition metals, transition metal oxides, or transition metal carbides. These metallic materials 18 may be in the form of nano- or micro-sized particles (i.e., having a diameter or average diameter ranging from about 0.1 nm to about 200 μm). The metallic materials 18 may also be in powder form. Some example metallic materials 18 include cobalt, tungsten carbide, and titanium carbide. Precursors of any of the listed metallic materials 18 may also be used in the suspension. As will be discussed further below, any of these metallic materials 18 may be used in the suspension with the ceramic material 14 to form the cermet coating or with a ceramic material 14 and an electrolyte 16 to form the cermet-electrolyte coating 15. As examples of the cermet coating, cobalt and tungsten carbide may be combined with chrome and silica to form one example of the cermet coating, tungsten carbide may be mixed with zirconia to form another example of the cermet coating, and titanium carbide may be mixed with alumina to form yet another example of the cermet coating.

When an electrolyte 16 is incorporated into the coating 13 or 15, the electrolyte 16 selected may depend upon the type of battery in which the coated separator 10, 10' will be used.

When the coated separator 10, 10' will be used in a lithium-sulfur battery, the electrolyte 16 may include an ether based solvent and a lithium salt dissolved therein. Examples of the ether based solvent include 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof; and examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$(LITFSI or Lithium Bis(Trifluoromethanesulfonyl)Imide), $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof When the coated separator 10, 10' will be used in a lithium ion battery, the electrolyte may include an organic solvent and a lithium salt dissolved therein. Examples of the organic solvent include cyclic carbonates (ethylene carbonate, propylene carbonate, butylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof and any of the previously listed examples of the lithium salt may be used.

When electrolytes are used to form the coatings 13, 15, the suspension may also include monomers, such as methyl methacrylate, acrylonitrile, vinyl chloride, and polyethylene glycol diacrylate. Methyl methacrylate or acrylonitrile may be desirable when the ceramic-electrolyte coating 13 or the cermet-electrolyte coating 15 to be formed includes $Al_2O_3$ and/or $SiO_2$.

Figure 3:
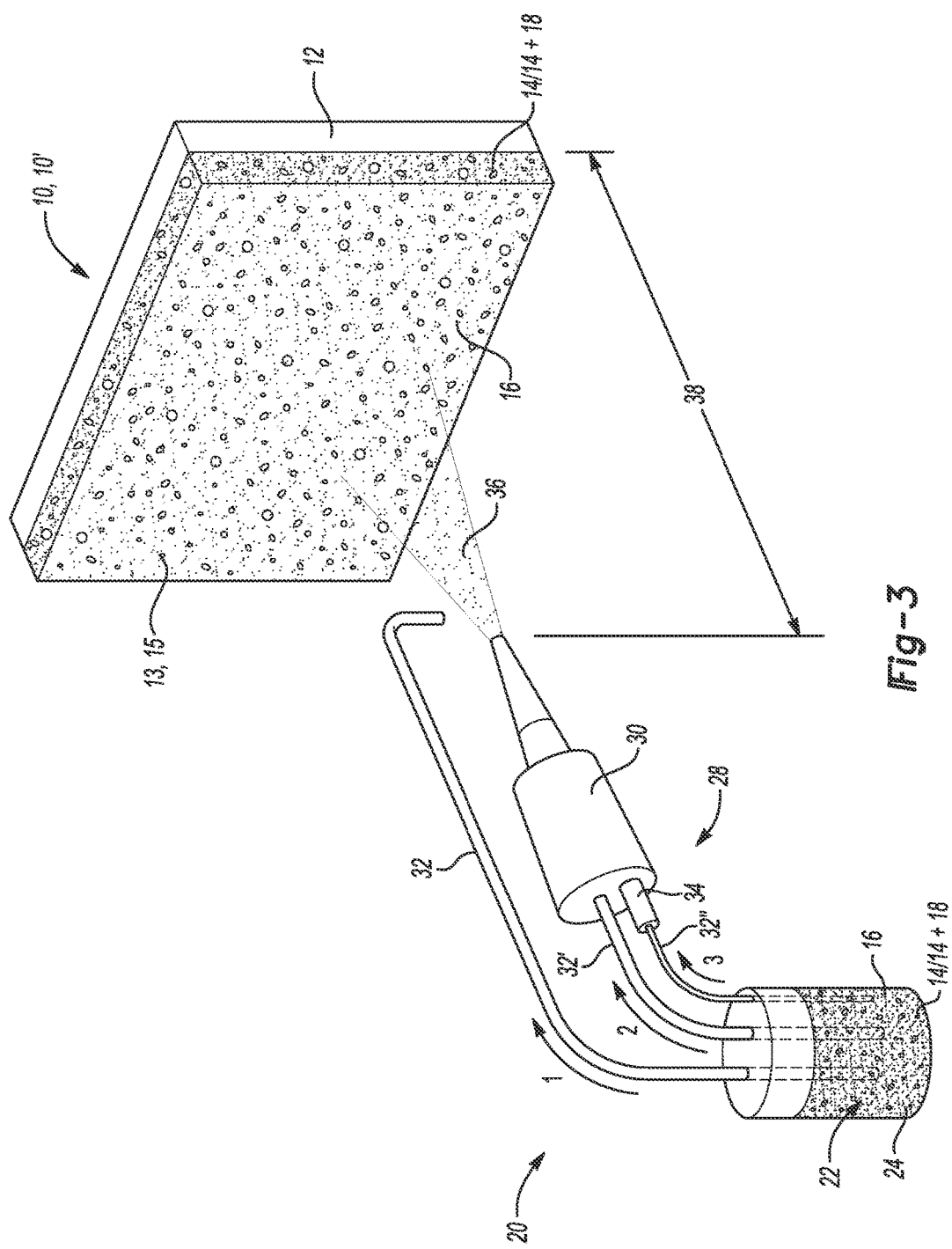
FIG. 3 is a schematic, perspective view of an example of a system for performing an example of a one-step method for preparing examples of the coated separator.

As mentioned above, the examples of the ceramic coating, the ceramic-electrolyte coating 13, the cermet coating, and the cermet-electrolyte coating 15 are formed by plasma spraying a suspension onto the porous membrane 12. The method generates the coated separator 10, 10' in a single plasma spraying step, without additional processing steps, such as lithiation. FIG. 3 schematically illustrates an example of a system 20 for forming the coated separator 10, 10'.

The suspension 22 used in the examples disclosed herein may vary depending upon the coating to be formed. In any of the examples, the suspension 22 includes the liquid carrier 24. The liquid carrier 24 may be water, an alcohol (e.g., ethanol, n-propanol, i-propanol, n-butanol, etc.), ethylene glycol, or any mixtures of these components may be used (e.g., a mixture of water and alcohol, a mixture of water and ethylene glycol, etc.). In some instances, the alcohol liquid carrier may be desirable because less energy is required to evaporate this carrier during plasma spraying. In addition, the liquid carrier 24 may affect the behavior of the other materials (ceramic, metallic, electrolyte) in the plasma, and thus may affect the morphology and properties of the resulting coatings. More particularly, the amount of liquid carrier 24 may alter the solids content, which may affect the viscosity, particle size, dispersant amount, etc., which in turn may affect the coating properties. By tuning the components of the suspension 22, the resulting coating may be a microstructure with a specific morphology, such as shape, size, and/or pores (e.g., columnar shaped, cauliflower shaped, etc.).

When the ceramic coating is to be formed, the suspension 22 will include the ceramic material 14 and the liquid carrier 24. When the ceramic-electrolyte coating 13 is to be formed, the suspension 22 will include the ceramic material 14, the electrolyte 16, and the liquid carrier 24. When the cermet coating is to be formed, the suspension 22 will include the ceramic material 14, the metallic material 18, and the liquid carrier 24. When the cermet-electrolyte coating 15 is to be formed, the suspension 22 will include the ceramic material 14, the metallic material 18, the electrolyte 16, and the liquid carrier 24. Examples of the suspension 22 used to form the ceramic-electrolyte coating 13 and the cermet-electrolyte coating 15 are shown in FIG. 2.

In some examples, the suspension 22 includes no other components in addition to those previously described. In other examples, the suspension 22 includes the previously mentioned monomer(s). In still other examples, the suspension 22 may include metal-organic precursors dispersed in isopropanol. The metal-organic precursor may be present in the suspension 22 in an amount ranging from about 1 wt % to about 50 wt % based upon the total wt % of the suspension 22. In an example, the metal-organic precursor is present in an amount of 10 wt %. Examples of the metal-organic precursors include aluminum heptanedionate as a precursor for alumina, triethylsilane as a precursor for silica, or titanium tetrakisdiethylamide as a precursor for titania.

In yet further examples, the suspension 22 may include a polymeric complex. The polymeric complex may be present in suspension 22 in an amount of about 1 wt % to about 10 wt % based upon the total wt % of the suspension 22. Organic acids may be used as the polymeric complex, examples of which include citrate, acetate, tartarate, formates, oxalate, and/or lactate. The polymeric complex may be selected to enhance the flow of the suspension 22 and/or to enhance the thermal properties of the coating that is formed. In still other examples, the suspension 22 includes a dispersant that aids in dispersing the ceramic material 14, metallic material 18, and/or electrolyte material 16 throughout the selected carrier liquid 24. The dispersant may be included in an amount ranging from about 0.1 wt % to about 5 wt % of the total wt % of the suspension 22. Examples of suitable dispersants include oligomeric dispersants and ethyl alcohol.

The suspension 22 has a solids content ranging from about 1% to about 50%. In another example, the suspension 22 has a solids content ranging from about 5% to about 30%. The grain/particle size distribution of the solid materials (e.g., the ceramic 14 and/or metallic 18 materials) in the suspension 22 and the viscosity of the suspension 22 may also be controlled. In an example, the grain/particle size may range from about 0.1 nm to about 200 μm, and the viscosity may be less than 30% (which is suitable to achieve proper flow).

In addition to the suspension 22, the system 20 shown in FIG. 3 also includes a plasma spray system 28. The plasma spray system 28 includes a plasma source 30 and a suspension feeding system 32, 32', 32".

The plasma source 30 includes a plasma torch, which generates a plasma jet 36. The plasma torch may create the plasma jet 36 using gas (e.g., air) and direct current (DC), alternating current (AC), or radio frequency (RF), and the plasma jet 36 may be gas-stabilized and/or water-stabilized. The spraying environment may involve air plasma spraying (APS), high velocity oxygen fuel spraying (HVOF), or vacuum plasma spraying (VPS).

The plasma source 30 is operated at relatively high current (e.g., 600 to 800 Amps) and low voltage (e.g., 60 to 80 Volts). The plasma spraying is also a high energy process (i.e., particle velocity higher than 2 Mach). In an example the temperature of the plasma spraying is less than 150° C. In another example, the temperature of plasma spraying ranges from about 37° C. to about 93° C. Still further, in another example, the temperature of the plasma spraying ranges from about 60° C. to about 70° C. It is believed that the combination of high energy and temperature leads to minimal incorporation of contaminants into the coating that is formed. Furthermore, these temperatures are low enough to avoid degradation of the porous membrane 12.

It is to be understood that the spray parameters (e.g., current, plasma power, particle flight, temperature, feed rate, etc.) and suspension 22 parameters (e.g., particle size, constituent phases, grain size, flowability, etc.) may be adjusted in order to avoid any overheating and/or to control features (e.g., thickness, morphology, porosity, density, etc.) of the coating.

The suspension feeding system 32, 32', 32" may be integrated into the plasma source 30 or may be a stand-alone unit. Different examples of the suspension feeding system 32, 32', 32" are shown in FIG. 3. In an example (labeled "1" in FIG. 3), the suspension feeding system 32 delivers the suspension 22 as a fine liquid-based stream directly into the plasma jet 36. In another example (labeled "2" in FIG. 3), the suspension feeding system 32' injects the suspension 22 directly into a combustion chamber of the plasma torch. In still another example (labeled "3" in FIG. 3), the suspension feeding system 32" injects the suspension 22 into an atomizer 34, which atomizes or nebulizes the suspension 22 into droplets that are introduced into the plasma jet 36. It is to be understood that the plasma spray system 28 does not utilize a carrier gas to introduce the materials 14 or 14 and 18, and/or 16 but rather uses the carrier liquid 24 of the suspension 22 to deliver the materials 14 or 14 and 18 to the plasma jet 36.

The feed rate may vary as is desirable or suitable for a particular suspension 22. In an example, the feed rate ranges from about 1 ml/min to about 500 ml/min. In another example, the feed rate ranges from about 20 ml/min to about 120 ml/min. The deposition rate of the materials 14 or 14 and 18, and/or 16 onto the membrane 12 ranges from about 30% to about 70% of the selected feed rate.

In the plasma jet 36, the suspension 22, in the form of the liquid-based stream or the droplets, is fragmented due, at least in part, to the flow and shear forces. The carrier liquid 24 in the suspension 22 is vaporized and evaporated. The evaporation of the carrier liquid 24 provides a cooling effect for the plasma jet 36 at its edges and extending outward into the environment surrounding the plasma jet 36. The cooled areas allow at least some of the materials 14 or 14 and 18 (those having their trajectory along these areas) within the plasma jet 36 to retain their spherical or unmelted shapes upon being deposited. In spite of the cooling effect, it is believed that the plasma jet 36 still includes hot zones, and materials 14 or 14 and 18 having a trajectory along these zones of the plasma jet 36 will melt or soften and form splats (i.e., small particles that aggregate together and form concentrated flat shapes) upon being deposited. In one example, the materials 14 or 14, 18 deposited to form the splats are at least partially melted. In another example, the materials 14 or 14, 18 deposited to form the splats are fully melted. In still another example, the materials 14 or 14, 18 deposited to form the splats are a mixture of partially melted and fully melted materials 14 or 14, 18. The melting state of the materials 14 or 14, 18 may be controlled by controlling a temperature of the plasma spraying and by controlling a feed rate of the suspension 22.

The plasma jet 36 accelerates the materials 14 or 14 and 18 and any electrolyte 16 that is present toward the porous membrane 12. It is again noted that the pores in the resulting coating 13, 15 and the membrane 12 are not shown in FIG. 3. When used, the electrolyte material 16 may be present in the pores of the coating and/or incorporated into the ceramic or cermet material.

The previously mentioned cooling effect is also believed to enhance the bond strength, and thus the adhesion, between the porous membrane 12 and the coating that is formed.

The plasma spraying of the suspension 22 may be continued for a suitable time to generate the coating having a desirable thickness. The amount of time that the plasma spraying of the suspension 22 is carried out for may vary depending on the line speed and feed rate. Generally, a higher line speed results in a faster plasma spraying of the suspension 22. For example, the line speed may be 1000 mm/s and the feed rate may range from about 200 mL/s to about 500 mL/s. In an example, the thickness ranges from about 0.1 μm to about 100 μm, or more (e.g., up to about 250 μm). In another example, the thickness ranges from 1 μm to about 20 μm. The thickness that may be achieved per pass of the plasma spray depends, at least in part on the process/spray parameters. As such, multiple spraying passes may be required in order to achieve a desired thickness.

The distance 38 between the end of the plasma source 30 and the porous membrane 12 may range from about 1 cm to about 50 cm. In some examples, a desired range is from about 5 cm to about 10 cm. This relatively short distance may be utilized because of the cooling effect introduced by the carrier liquid 24 and because the inertia of the materials 14 or 14 and 18, and in some instances 16, is low (due in part to relatively stable plasma conditions, such as temperature and velocity).

The method disclosed herein provides a stable, pulse-free suspension stream in order to produce a reproducible, high quality coated separator 10, 10'. The coating morphology and properties may be affected by the nature of the suspension 22, the mode by which the suspension 22 is injected, and the spraying parameters. By varying one or more of these factors, the density and/or porosity of the coating may be controlled. As an example, if larger particles are used in the suspension 22, a denser coating with large pores would be formed. A suitably dense coating may be obtained by selecting a particle size that is not too large but not too small (i.e., in accordance with the particle size range provided herein). In any of the examples disclosed herein, the resulting coating is believed to be free of defects (e.g., cracks, etc.)

The ceramic coated separator, ceramic-electrolyte coated separator 10, the cermet coated separator, or the cermet-electrolyte coated separator 10' that is formed may be used as the separator of a lithium-sulfur battery or a lithium ion battery. As noted above, the electrolyte material 16 may vary depending upon the type of battery in which the coated separator is to be used. An example of the lithium-sulfur battery 40 is shown in FIG. 4, and an example of the lithium ion battery 50 is shown in FIG. 5.

Figure 4:
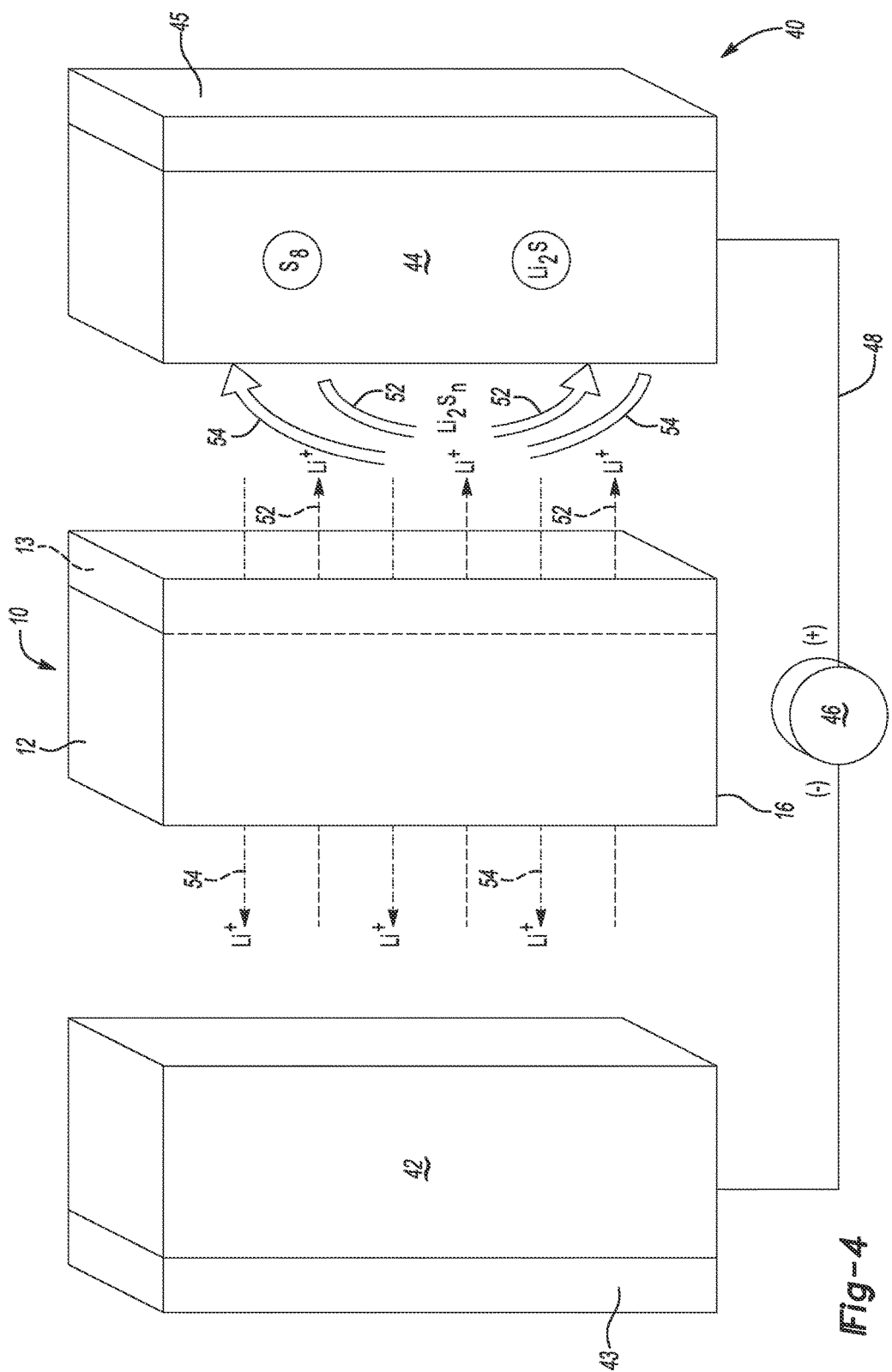
FIG. 4 is a schematic, perspective view of an example of a lithium-sulfur battery showing a charging and discharging state, the battery including an example of coated separator disclosed herein.
Figure 5:
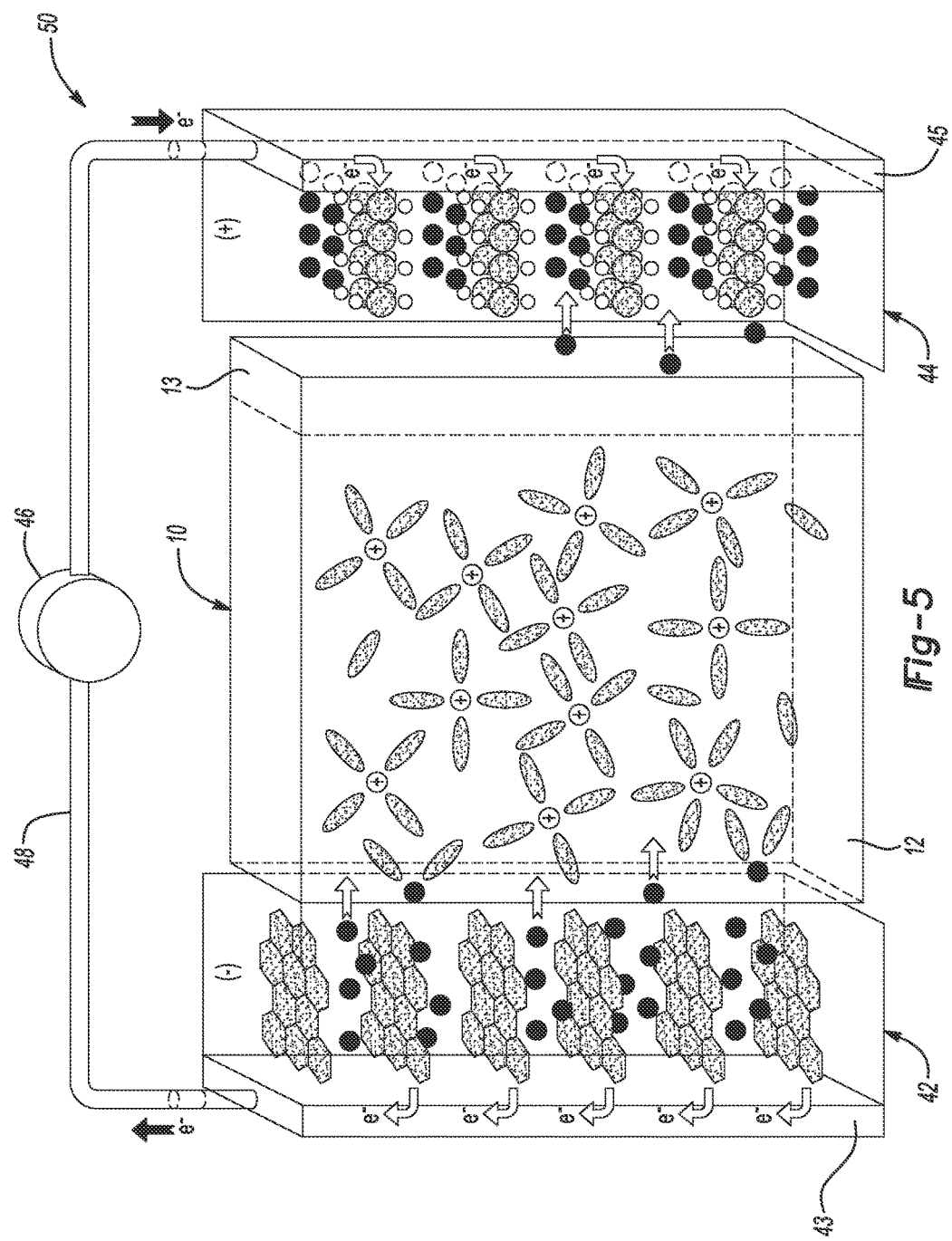
FIG. 5 is a schematic, perspective view of an example of a lithium ion battery during a discharging state, the battery including an example of the coated separator disclosed herein.

Referring now to FIG. 4, the lithium-sulfur battery 40 includes an anode (negative electrode) 42, a cathode (positive electrode 44), and an example of the coated separator 10 disclosed herein. The lithium-sulfur battery 40 also includes an interruptible external circuit 48 that connects the anode 42 and the cathode 44. The anode 42, the cathode 44, and the coated separator 10 are soaked in an electrolyte solution that is capable of conducting lithium ions. When the separators 10, 10' are used, the coatings 13, 15 already have electrolyte material therein, and any additional electrolyte solution will simply add to the lithium conductivity.

The coated separator 10, which operates as both an electrical insulator and a mechanical support, is sandwiched between the anode 42 and the cathode 44 to prevent physical contact between the two electrodes 42, 44 and the occurrence of a short circuit. The coated separator 10 is positioned so that the bulk of the coating 13 faces the cathode 44. The coating 13 acts as a barrier layer between the porous membrane 12 and the cathode 44 in order to prevent the passage of polysulfide ions across the separator 10. The porous separator 10, in addition to providing a physical barrier between the two electrodes 42, 44, ensures passage of lithium ions (identified by the Li+) and some related anions through the electrolyte solution filling its pores, and in some instances integrated into the coating 13 (or 15).

The anode 42 may include any lithium host material (i.e., active material) that can sufficiently provide a lithium source for lithium redox reactions that does not react with the current collector 43 that functions as the negative terminal of the lithium-sulfur battery 40. In an example, the anode 42 is a silicon-based material that is prelithiated, using a similar suspension spraying process as disclosed herein (e.g., by spraying a suspension of lithium and silicon onto a current collector). In another example, the anode 42 of the lithium-sulfur battery 40 may include graphite as the active material. Graphite is widely utilized to form the anode 42 because it exhibits reversible lithium intercalation and deintercalation characteristics, is relatively non-reactive, and can store lithium in quantities that produce a relatively high energy density. Commercial forms of graphite that may be used to fabricate the anode 42 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate.

In addition to the lithium host material/active material, the anode 42 may also include a polymer binder material to structurally hold the lithium host material together and a conductive filler to improve electrical conductivity. Suitable binders include styrene-butadiene rubber (SBR), styrene-butadiene rubber carboxymethyl cellulose (SBR-CMC), polyethylene oxide (PEO), polyacrylic acid (PAA), polyvinyl alcohol (PVA), poly(acrylamide-co-diallyl dimethyl ammonium chloride), cross-linked polyacrylic acid-polyethylenimine, polyimide, polyvinylidene fluoride (PVdF), an ethylene propylene diene monomer (EPDM) rubber, sodium alginate, carboxymethyl cellulose (CMC), other water or organic solvent based binders, or any other suitable binder material known to skilled artisans. These materials may be mixed with a high surface area carbon, such as acetylene black or activated carbon, as the conductive filler to ensure electron conduction between the current collector 43 and the active material particles of the anode 42.

The negative-side current collector 43 may be formed from copper or any other appropriate electrically conductive material known to skilled artisans. The negative-side current collector 43 collects and moves free electrons to and from the external circuit 48.

The cathode 44 of the lithium-sulfur battery 40 may be formed from any sulfur-based active material that can sufficiently undergo alloying and dealloying with aluminum or another suitable current collector 45 functioning as the positive terminal of the lithium-sulfur battery 40. Examples of sulfur-based active materials include $S_8$, $Li_2S_8$, $Li_2S_6$, $Li_2S_4$, $Li_2S_2$, and $Li_2S$. Another example may be sulfur-carbon composite. The cathode 44 may be encapsulated with carbon and may also include a polymer binder material to structurally hold the sulfur-based active material together. The polymer binder may be made of at least one of polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyvinyl alcohol (PVA), polyimide, poly(acrylamide-co-diallyl dimethyl ammonium chloride), sodium alginate, or other water-soluble or organic solvent-based binders.

A positive-side current collector 45 may be formed from aluminum or any other appropriate electrically conductive material known to skilled artisans. The positive-side current collector 45 collects and moves free electrons to and from the external circuit 48.

Any appropriate electrolyte solution (not shown) that can conduct lithium ions between the anode 42 and the cathode 44 may be used in the lithium-sulfur battery 40. In one example, the non-aqueous electrolyte solution may be an ether based electrolyte that is stabilized with lithium nitrite. Other non-aqueous liquid electrolyte solutions may include a lithium salt dissolved in an organic solvent or a mixture of organic solvents. Examples of lithium salts that may be dissolved in ether to form the non-aqueous liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(FSO_2)_2$ (LiFSI), $LiN(CF_3SO_2)_2$ (LITFSI), $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. The ether based solvents may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof The lithium-sulfur battery 40 may support a load device 46 that can be operatively connected to the external circuit 48, which connects the anode 42 and cathode 44. The load device 46 receives a feed of electrical energy from the electric current passing through the external circuit 48 when the lithium-sulfur battery 40 is discharging. As such, the load device 46 may be powered fully or partially by the electric current passing through the external circuit 48 when the lithium-sulfur battery 40 is discharging. While the load device 46 may be any number of known electrically-powered devices, a few specific examples of a power-consuming load device include an electric motor for a hybrid vehicle or an all-electrical vehicle, a laptop computer, a cellular phone, and a cordless power tool. The load device 46 may also, however, be a power-generating apparatus that charges the lithium-sulfur battery 40 for purposes of storing energy. For instance, the tendency of windmills and solar panels to variably and/or intermittently generate electricity often results in a need to store surplus energy for later use.

The lithium-sulfur battery 40 can include a wide range of other components that, while not depicted here, are nonetheless known to skilled artisans. For instance, the lithium-sulfur battery 40 may include a casing, gaskets, terminals, tabs, and any other desirable components or materials that may be situated between or around the anode 42 and the cathode 44 for performance-related or other practical purposes. Moreover, the size and shape of the lithium-sulfur battery 40, as well as the design and chemical make-up of its main components, may vary depending on the particular application for which it is designed. Battery-powered automobiles and hand-held consumer electronic devices, for example, are two instances where the lithium-sulfur battery 40 would most likely be designed to different size, capacity, and power-output specifications. The lithium-sulfur battery 40 may also be connected in series and/or in parallel with other similar lithium-sulfur batteries 40 to produce a greater voltage output and current (if arranged in parallel) or voltage (if arranged in series) if the load device 46 so requires.

The lithium-sulfur battery 40 can generate a useful electric current during battery discharge (shown by reference numeral 52 in FIG. 4). During discharge, the chemical processes in the battery 40 include lithium (Li$^+$) dissolution from the surface of the anode 42 and incorporation of the lithium cations into alkali metal polysulfide salts (i.e., Li$_2$S). As such, polysulfides are formed (sulfur is reduced) on the surface of the cathode 44 in sequence while the battery 40 is discharging. The chemical potential difference between the cathode 44 and the anode 42 (ranging from approximately 1.5 to 3.0 volts, depending on the exact chemical make-up of the electrodes 42, 44) drives electrons produced by the dissolution of lithium at the anode 42 through the external circuit 48 towards the cathode 44. The resulting electric current passing through the external circuit 48 can be harnessed and directed through the load device 46 until the lithium in the anode 42 is depleted and the capacity of the lithium-sulfur battery 40 is diminished.

The lithium-sulfur battery 40 can be charged or re-powered at any time by applying an external power source to the lithium-sulfur battery 40 to reverse the electrochemical reactions that occur during battery discharge. During charging (shown at reference numeral 54 in FIG. 4), lithium plating to the anode 42 takes place, and sulfur formation at the cathode 44 takes place. The connection of an external power source to the lithium-sulfur battery 40 compels the otherwise non-spontaneous oxidation of lithium at the cathode 44 to produce electrons and lithium ions. The electrons, which flow back towards the anode 42 through the external circuit 48, and the lithium ions (Li$^+$), which are carried by the electrolyte across the porous separator 10 back towards the anode 42, reunite at the anode 42 and replenish it with lithium for consumption during the next battery discharge cycle. The external power source that may be used to charge the lithium-sulfur battery 40 may vary depending on the size, construction, and particular end-use of the lithium-sulfur battery 40. Some suitable external power sources include a battery charger plugged into an AC wall outlet and a motor vehicle alternator.

Referring now to FIG. 5, the lithium ion battery 50 includes the anode (negative electrode) 42, the cathode (positive electrode) 44', and an example of the coated separator 10 disclosed herein. The lithium ion battery 50 also includes the interruptible external circuit 48 that connects the anode 42 and the cathode 44'. The anode 42, the cathode 44, and the coated separator 10 are soaked in an electrolyte solution that is capable of conducting lithium ions. When the separators 10, 10' are used, the coatings 13, 15 already have electrolyte material therein, and any additional electrolyte solution will simply enhance the lithium conductivity.

Any example of the anode 42, the negative-side current collector 43, and the positive-side current collector 45 described herein may be used in the lithium ion battery 50.

The cathode 44' of the lithium ion battery 50 may be formed from any lithium-based active material that can sufficiently undergo lithium insertion and deinsertion while aluminum or another suitable current collector 45 is functioning as the positive terminal of the lithium ion battery 50. One common class of known lithium-based active materials suitable for the cathode 44' includes layered lithium transitional metal oxides. Some specific examples of the lithium-based active materials include spinel lithium manganese oxide (LiMn$_2$O$_4$), lithium cobalt oxide (LiCoO$_2$), a nickel-manganese oxide spinel [Li(Ni$_{0.5}$Mn$_{1.5}$)O$_2$], a layered nickel-manganese-cobalt oxide [Li(Ni$_x$Mn$_y$Co$_z$)O$_2$ or Li(Ni$_x$Mn$_y$Co$_z$)O$_4$, or a lithium iron polyanion oxide, such as lithium iron phosphate (LiFePO$_4$) or lithium iron fluorophosphate (Li$_2$FePO$_4$F). Other lithium-based active materials may also be utilized, such as LiNi$_x$M$_{1-x}$O$_2$ (M is composed of any ratio of Al, Co, and/or Mg), aluminum stabilized lithium manganese oxide spinel (Li$_x$Mn$_{2-x}$Al$_y$O$_4$), lithium vanadium oxide (LiV$_2$O$_5$), Li$_2$MSiO$_4$ (M is composed of any ratio of Co, Fe, and/or Mn), xLi$_2$MnO$_{3-(1-x)}$LiMO$_2$ (M is composed of any ratio of Ni, Mn and/or Co), and any other high efficiency nickel-manganese-cobalt material. By "any ratio" it is meant that any element may be present in any amount. So, for example M could be Al, with or without Co and/or Mg, or any other combination of the listed elements.

The lithium-based active material of the cathode 44' may be intermingled with the polymeric binder and a high surface area carbon (i.e., conductive filler). Suitable binders include polyvinylidene fluoride (PVdF), an ethylene propylene diene monomer (EPDM) rubber, and/or carboxymethyl cellulose (CMC), or any of the binders previously discussed herein. The polymeric binder structurally holds the lithium-based active materials and conductive filler together. An example of the high surface area carbon is acetylene black. The high surface area carbon ensures electron conduction between the positive-side current 45 38 and the active material particles of the cathode 44'.

Furthermore, any of the examples of the porous separator (e.g., the ceramic coated separator, the ceramic-electrolyte coated separator 10, the cermet coated separator, the cermet-electrolyte coated separator 10') disclosed herein may be used in the lithium ion battery 50. The coated separator 10, which operates as both an electrical insulator and a mechanical support, is sandwiched between the anode 42 and the cathode 44' to prevent physical contact between the two electrodes 42, 44' and the occurrence of a short circuit. The coated separator 10 is positioned so that the bulk of the coating 13 faces the cathode 44'. The coating 13 acts as a barrier layer between the porous membrane 12 and the cathode 44' in order to prevent the passage of manganese (or other transition metal) ions across the separator 10. The porous separator 10, in addition to providing a physical barrier between the two electrodes 42, 44', ensures passage of lithium ions (identified by the black dots and by the open circles having a (+) charge in FIG. 5) and some related anions through the electrolyte solution filling its pores, and in some instances integrated into the coating 13 (or 15).

Any appropriate electrolyte solution that can enhance the conductivity of, and wet the cathode 44' may be used in the lithium ion battery 50. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. Examples of lithium salts that may be dissolved in an organic solvent to form the non-aqueous liquid electrolyte solution for the battery 10' include LiClO$_4$, LiAlCl$_4$, LiI, LiBr, LiSCN, LiBF$_4$, LiB(C$_6$H$_5$)$_4$, LiAsF$_6$, LiCF$_3$SO$_3$, LiN(FSO$_2$)$_2$ (LiFSI), LiN(CF$_3$SO$_2$)$_2$(LITFSI), LiPF$_6$, LiB(C$_2$O$_4$)$_2$ (LiBOB), LiBF$_2$(C$_2$O$_4$) (LiODFB), LiPF$_4$(C$_2$O$_4$) (LiFOP), LiNO$_3$, and mixtures thereof. These and other similar lithium salts may be dissolved in a variety of organic solvents such as cyclic carbonates (ethylene carbonate, propylene carbonate, butylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

The electrolyte solution may also include a number of additives, such as solvents and/or salts that are minor components of the solution. Example additives include lithium bis(oxalato borate (LiBOB), lithium difluoro oxalate borate (LiDFOB), vinylene carbonate, monofluoroethylene carbonate, propane sultone, 2-propyn-ol-methanesulfonate, methyl di-fluoro-acetate, succinic anhydride, maleic anhydride, adiponitrile, biphenyl, ortho-terphenyl, dibenzyl, diphenyl ether, n-methylpyrrole, furan, tiophene, 3,4-ethylenedioxythiophene, 2,5-dihydrofuran, trishexafluoro-isopropylphosphate, trihydroxybenzene, tetramethoxytitanium, etc. While some examples have been given herein, it is to be understood that other additives could be used. When included, additives may make up from about 0.05% to about 5% of the composition of the electrolyte solution for the lithium ion battery 50.

Other electrolytes may be used instead of the electrolyte solution. As examples, polymer electrolytes, ionic liquids, melt electrolytes, or the like may be used. Some specific examples of ionic liquids include 1-ethyl-3-methylimidazolium bis(fluorosulfonyl)imide, 1-ethyl-3-methylimidazolium bis(trifluoromethane sulfonyl)imide, phosphonium bis(trifluoromethane sulfonyl) imide, phosphonium bis(fluorosulfonyl) imide, triethyl(methoxymethyl) phosphonium bis(trifluoromethylsulfonyl)imide, triethyl(2-methoxyethyl)phosphonium, and bis(trifluoromethylsulfonyl)imide. Some examples of melt electrolytes include lithium bis(fluorosulfonyl)imide in dimethylmethanesulfonamide and lithium bis(trifluoromethane sulfonyl)imide in dimethylmethanesulfonamide. While some examples have been given herein, it is to be understood that other polymer electrolytes, ionic liquids, and melt electrolytes could be used.

The lithium ion battery 50 may support a load device 46 that can be operatively connected to the external circuit 48, which connects the anode 42 and cathode 44'. The load device 46 receives a feed of electrical energy from the electric current passing through the external circuit 48 when the lithium ion battery is discharging. As such, the load device 46 may be powered fully or partially by the electric current passing through the external circuit 48 when the lithium ion battery 50 is discharging. Any examples of the load device 46 provided herein may be used in the lithium ion battery 50.

The lithium ion battery 50 can also include a wide range of other components that, while not depicted here, are nonetheless known to skilled artisans. For instance, the lithium ion battery 50 may include a casing, gaskets, terminals, tabs, and any other desirable components or materials that may be situated between or around the anode 42 and the cathode 44' for performance-related or other practical purposes. Moreover, the size and shape of the lithium ion battery 50, as well as the design and chemical make-up of its main components, may vary depending on the particular application for which it is designed. Battery-powered automobiles and hand-held consumer electronic devices, for example, are two instances where the lithium ion battery 50 would most likely be designed to different size, capacity, and power-output specifications. The lithium ion battery 50 may also be connected in series and/or in parallel with other similar lithium ion battery 50 to produce a greater voltage output and current (if arranged in parallel) or voltage (if arranged in series) if the load device 46 so requires.

The lithium ion battery 50 can generate a useful electric current during battery discharge by way of reversible electrochemical reactions that occur when the external circuit 48 is closed to connect the anode 42 and the cathode 44 at a time when the anode 42 contains a sufficiently higher relative quantity of intercalated lithium. The chemical potential difference between the cathode 44' and the anode 42 (ranging from approximately 1.5 volts to 5.0 volts, depending on the exact chemical make-up of the electrodes 42, 44) drives electrons produced by the oxidation of intercalated lithium at the anode 42 through the external circuit 48 towards the cathode 44'. Lithium ions, which are also produced at the anode 42, are concurrently carried by the anions through the porous separator 10 and towards the cathode 44'. The electrons flowing through the external circuit 48 and the lithium ions migrating across the porous separator 10 in the liquid electrolyte eventually reconcile and form intercalated lithium at the cathode 44'. The electric current passing through the external circuit 48 can be harnessed and directed through the load device 46 until the intercalated lithium in the anode 42 is depleted and the capacity of the lithium ion battery 50 is diminished.

The lithium ion battery 50 can be charged or re-powered at any time by applying an external power source to the lithium ion battery 50 to reverse the electrochemical reactions that occur during battery discharge. The connection of an external power source to the lithium ion battery 50 compels the otherwise non-spontaneous oxidation of lithium transition metal oxide or phosphate at the cathode 44' to produce electrons and release lithium ions. The electrons, which flow back towards the anode 42 through the external circuit 48, and the lithium ions, which are carried by the liquid electrolyte across the porous separator 10 back towards the anode 42, reunite at the anode 42 and replenish the anode 42 with intercalated lithium for consumption during the next battery discharge cycle. In this example, while the coating 13 carries the lithium ions through its pores, it also blocks the passage of manganese (or other transition metal) cations from the cathode 44' to the anode 42.

The external power source that may be used to charge the lithium ion battery 50 may vary depending on the size, construction, and particular end-use of the lithium ion battery 50. Some suitable external power sources include a battery charger plugged into an AC wall outlet and a motor vehicle alternator.

It is to be understood that the ranges provided herein include the stated range and any value or sub-range within the stated range. For example, a range of about 1 nm to about 200 µm should be interpreted to include not only the explicitly recited limits of about 1 nm to about 200 µm, but also to include individual values, such as 25 nm, 42 nm, 90.5 nm, etc., and sub-ranges, such as from about 5 nm to about 75 µm; from about 20 nm to about 55 µm, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A one-step method for preparing a coated separator, the one step method comprising:
plasma spraying, without a carrier gas, a suspension of i) a ceramic with an electrolyte, or ii) a cermet with an electrolyte, in a carrier liquid of water, alcohol, ethylene glycol, or mixtures thereof, the suspension including a monomer selected from the group consisting of methyl methacrylate, acrylonitrile, vinyl chloride, and polyethylene glycol diacrylate.

2. The one-step method as defined in claim 1 wherein the suspension further includes a metal-organic precursor in isopropanol.

3. The one-step method as defined in claim 1 wherein the suspension further includes a polymeric complex.

4. The one-step method as defined in claim 1 wherein the suspension is introduced as a liquid stream into plasma jet used in the plasma spraying.

5. The one-step method as defined in claim 1 wherein the suspension is nebulized into droplets and then introduced into plasma jet used in the plasma spraying.

6. The one-step method as defined in claim 1 wherein the suspension further includes a dispersant.

7. The one-step method as defined in claim 1 wherein the plasma spraying is performed at a temperature less than or equal to 150° C.

8. The one-step method as defined in claim 1 wherein:
the suspension of i) the ceramic with the electrolyte includes a ceramic material and the electrolyte; or
the suspension of ii) the ceramic with the electrolyte includes a ceramic material, a metallic material, and the electrolyte.

9. The one-step method as defined in claim 8 wherein the plasma spraying forms a coating on a porous membrane, and wherein the method further comprises controlling a temperature of the plasma spraying to control a melting state of the ceramic material or the ceramic material and the metallic material.

10. The one-step method as defined in claim 9 wherein the ceramic material is at least partially melted, or the ceramic material and the metallic material are at least partially melted.

11. The one-step method as defined in claim 1 wherein the plasma spraying forms a coating on a porous membrane and wherein the carrier liquid in the suspension causes a cooling effect during plasma spraying, whereby a bond strength between the coating and the porous membrane is increased.

12. The one-step method as defined in claim 1 wherein the carrier liquid is water and wherein no external cooling mechanism is used in the one-step method.

13. The one-step method as defined in claim 1 wherein the plasma spraying forms a coating on a porous membrane and wherein the method further comprises adjusting a parameter of the plasma spraying to control a thickness of the coating such that the thickness ranges from about 0.1 μm to about 250 μm.

14. The one-step method as defined in claim 1 wherein the plasma spraying forms a coating on a porous membrane and wherein the method further comprises adjusting a parameter of the plasma spraying to control a porosity of the coating.

* * * * *